(12) United States Patent
Masuo

(10) Patent No.: US 10,792,742 B2
(45) Date of Patent: Oct. 6, 2020

(54) MAIN SPINDLE UNIT AND MACHINE TOOL

(71) Applicant: MITSUBISHI HEAVY INDUSTRIES MACHINE TOOL CO., LTD., Ritto-shi, Shiga (JP)

(72) Inventor: Koichi Masuo, Ritto (JP)

(73) Assignee: MITSUBISHI HEAVY INDUSTRIES MACHINE TOOL CO., LTD., Shiga (JP)

( * ) Notice: Subject to any disclaimer, the term of this patent is extended or adjusted under 35 U.S.C. 154(b) by 19 days.

(21) Appl. No.: 16/343,512

(22) PCT Filed: Oct. 26, 2017

(86) PCT No.: PCT/JP2017/038694
§ 371 (c)(1),
(2) Date: Apr. 19, 2019

(87) PCT Pub. No.: WO2018/079650
PCT Pub. Date: May 3, 2018

(65) Prior Publication Data
US 2019/0262920 A1  Aug. 29, 2019

(30) Foreign Application Priority Data

Oct. 26, 2016  (JP) .................. 2016-209238

(51) Int. Cl.
B23Q 5/04 (2006.01)
B23F 5/20 (2006.01)
H02K 5/04 (2006.01)

(52) U.S. Cl.
CPC .............. B23F 5/20 (2013.01); B23Q 5/04 (2013.01); H02K 5/04 (2013.01); Y10T 409/309352 (2015.01)

(58) Field of Classification Search
CPC ... Y10T 409/309352; B23Q 5/04; B23F 5/20; B23F 5/202; B23F 5/22; B23F 5/24;
(Continued)

(56) References Cited

U.S. PATENT DOCUMENTS 4,180,946 A * 1/1980 Heijkenskjold .......... B23Q 5/10
310/90.5
5,033,922 A * 7/1991 Watanabe ............. B23B 31/265
409/233

(Continued)

FOREIGN PATENT DOCUMENTS

EP  3112061 A1  1/2017
JP  9-19826 A   1/1997
(Continued)

OTHER PUBLICATIONS

International Search Report for International Application No. PCT/JP2017/038694, dated Jan. 30, 2018 with English translation.

(Continued)

Primary Examiner — Alan Snyder
Assistant Examiner — Yasir A Diab
(74) Attorney, Agent, or Firm — Birch, Stewart, Kolasch & Birch, LLP

(57) ABSTRACT

The main spindle unit has a main spindle, a front bearing, a rear bearing, a front case for covering the front bearing, and a rear case for covering the rear bearing. The front case has a front body part for holding the front bearing and a front flange part extending radially outward from the front body part. The rear case has a rear body part for holding the rear bearing and a rear flange part extending radially outward from the rear body part. A front mounted surface, which can be brought into contact with a first mounting surface of a unit support table, is formed on the front flange part so as to face the front side thereof. A rear mounted surface, which (Continued)

contacts a second mounting surface of the unit support table, is formed on the rear flange part so as to face the front side thereof.

8 Claims, 10 Drawing Sheets

(58) Field of Classification Search
CPC .... B23F 5/26; B23F 5/27; B23F 15/00; B23F 21/12; B23F 21/122; B23F 21/16; H02K 5/04; H02K 5/06; H02K 5/08; H02K 5/10
See application file for complete search history.

(56) References Cited

U.S. PATENT DOCUMENTS

| | | | |
|---|---|---|---|
| 5,813,806 A | 9/1998 | Müller | |
| 7,972,096 B2* | 7/2011 | Kikkawa | B23B 31/265 408/56 |
| 8,939,686 B2* | 1/2015 | Masuo | B23F 23/006 409/12 |
| 8,979,616 B2* | 3/2015 | Katsuma | B23F 23/006 451/253 |
| 2006/0269375 A1 | 11/2006 | Takayama et al. | |
| 2007/0154274 A1* | 7/2007 | Petrescu | B23B 31/261 409/233 |
| 2008/0220922 A1* | 9/2008 | Katsuma | B23Q 16/025 475/31 |
| 2008/0231129 A1* | 9/2008 | Kubo | F16C 32/048 310/90.5 |
| 2009/0116924 A1* | 5/2009 | Shinano | B23B 31/265 409/232 |
| 2011/0081216 A1* | 4/2011 | Ogura | B23Q 11/0039 409/141 |
| 2013/0255454 A1* | 10/2013 | Yamamoto | B23Q 1/70 82/146 |
| 2013/0336603 A1* | 12/2013 | Matsunaga | B23Q 1/38 384/101 |
| 2015/0078854 A1* | 3/2015 | Calzavara | B23Q 1/70 409/231 |

FOREIGN PATENT DOCUMENTS

| | | |
|---|---|---|
| JP | 2006-326803 A | 12/2006 |
| JP | 2010-158748 A | 7/2010 |
| TW | 201418591 A | 5/2014 |
| TW | 201540418 A | 11/2015 |
| TW | M528828 U | 9/2016 |

OTHER PUBLICATIONS

Taiwanese Office Action and Search Report for Taiwanese, Application No. 106136883, dated Jul. 30, 2018, with English translation.
Written Opinion of the International Searching Authority for International Application No. PCT/JP2017/038694, dated Jan. 30, 2018, with English translation.

* cited by examiner

MAIN SPINDLE UNIT AND MACHINE TOOL

TECHNICAL FIELD

The present invention relates to a main spindle unit which holds a tool and rotates the tool and a machine tool having the main spindle unit.

Priority is claimed on Japanese Patent Application No. 2016-209238, filed Oct. 26, 2016, the content of which is incorporated herein by reference.

BACKGROUND ART

For example, as a machine tool, there is a bobbing machine which processes a workpiece which is a gear material so as to manufacture a gear.

For example, a hobbing machine described in the following PTL 1 includes a tool unit (or main spindle unit) which holds a hob cutter and a feed base (or slider) to which the tool unit is attached.

The tool unit has a main spindle, a motor rotor which is fixed to an outer periphery of the main spindle, a motor stator which is disposed on an outer periphery of the motor rotor, a front bearing and a rear bearing which rotatably support the main spindle, a case which covers these, and a collet chuck which holds the hob cutter. The main spindle extends in an axial direction about an axis. The collet chuck is provided on a front end in the axial direction of the main spindle. The front bearing is disposed in front of the motor rotor. The rear bearing is disposed behind the motor rotor. The case has a motor case which covers an outer periphery of the motor stator, a front case which covers an outer periphery of the front bearing, and a rear case which covers the rear bearing. The front case has a cylindrical body portion and a flange portion which extends radially outward from a front end of the body portion with respect to the axis.

The feed base extends in the axial direction of the main spindle. The tool unit is fixed to a rear side of the feed base. A corresponding bearing, which supports a first end of the hob cutter such that the hob cutter is rotatable, is provided on a front side of the feed base. A second end of the hob cutter is held by the collet chuck of the tool unit. A mounting surface facing the front side is formed on the feed base. A mounted surface in the flange portion of the front case facing the rear side comes into contact with the mounting surface of the feed base.

CITATION LIST

Patent Literature

[PTL 1] Japanese Unexamined Patent Application Publication No. 09-019826

SUMMARY OF INVENTION

Technical Problem

In the tool unit (or main spindle unit) described in PTL 1, the mounted surface in the flange portion of the front case facing the rear side faces the mounting surface in the feed base facing the front side. Accordingly, when the tool unit fails and thus, the fool unit is removed from the feed base, it is not possible to separate the tool unit rearward from the feed base. Accordingly, when the tool unit is removed from the feed base, after the front case is removed from the motor case, the front case is moved forward. Thereafter, it is considered that other portions of the tool unit are separated rearward from the feed base. In addition, when the tool unit is attached to the feed base, it is considered that other portions of the tool unit are fixed to the feed base after the front case are fixed to the feed base.

As described above, in the main spindle unit (or tool unit) described in PTL 1, there is a problem that it takes time to detach and attach the main spindle unit (or the tool unit).

Accordingly, an object of the present invention is to provide a main spindle unit capable of easily attaching and detaching the main spindle unit and a machine tool having the main spindle unit.

Solution to Problem

In order to achieve the object, according to an aspect of the present invention, there is provided a main spindle unit which is attached to a unit support table which supports a first end of a tool such that the tool is able to rotate about an axis and holds a second end of the tool to rotate the tool about the axis, the unit including: a main spindle which extends in an axial direction, in which the axis extends, about the axis; a motor rotor which is fixed to an outer periphery of the main spindle; a motor stator which is disposed on an outer periphery of the motor rotor; a holder which is provided on a front side which is one end side of the main spindle in the axial direction and holds the tool; a front bearing which is disposed on the front side of the motor rotor and on a rear side of the holder, the rear side being a side opposite to the front side, and rotatably supports the main spindle; a rear bearing which is disposed on the rear side of the motor rotor and rotatably supports the main spindle; a motor case which has a tubular shape about the axis and in which the motor stator is fixed to an inner peripheral surface thereof; a front case which covers an outer periphery of the front bearing; and a rear case which covers an outer periphery of the rear bearing. The front case has a front body portion which covers the outer periphery of the front bearing to hold the front bearing and a front flange portion which extends radially outward with respect to the axis from an outer periphery of the front body portion. The rear case has a rear body portion which covers an outer periphery of the rear bearing to hold the rear bearing and a rear flange portion which extends radially outward from an outer periphery of the rear body portion. An outer diameter of the front body portion is smaller than an inner diameter of the motor case. In the front flange portion, a front mounted surface which is able to come into contact with a first mounting surface of the unit support table facing the rear side and a contact surface which is in contact with the motor case are formed so as to face the front side. An outer diameter of the rear flange portion is larger than an outer diameter of the motor case. In the rear flange portion, a rear mounted surface which is in contact with a second mounting surface of the unit support table facing the rear side is formed so as to face the front side.

Both the first mounting surface and the second mounting surface of the unit support table face toward the rear side. In addition, in the main spindle unit, both the front mounted surface of the main spindle unit facing the first mounting surface in the axis direction and the rear mounted surface of the main spindle unit facing the second mounting surface in the axis direction face the front side. Accordingly, when the main spindle unit is removed from the unit support table, it is possible to separate the main spindle unit toward the rear side from the unit support table without disassembling the main spindle unit. Therefore, in the main spindle unit, it is possible to easily detach the main spindle unit from the unit support table. Moreover, in the main spindle unit, the main spindle unit can be attached to the unit support table in a state where the main spindle unit is assembled, and thus, it is possible to easily attach the main spindle unit to the unit support table.

Here, in the main spindle unit, a bolt threaded hole may be formed in the front flange portion.

In the main spindle unit, a bolt screw can be screwed into the bolt threaded hole of the front flange portion from the front side.

Moreover, in any one of the above-described main spindle units, a bolt insertion hole which penetrates the rear flange portion from the rear mounted surface toward the rear side is formed in the rear flange portion.

In the main spindle unit, a bolt screw can be inserted into the bolt insertion hole of the rear flange portion from the rear side.

In any one of the above-described main spindle units, the front flange portion may extend radially outward from a portion including a rear side end of the front body portion.

In the main spindle unit, the front flange portion of the front case extends radially outward from the portion including the rear side end of the front body portion. Accordingly, in the main spindle unit, even in a case where a workpiece disposed on the front side of the main spindle unit large, it is possible to avoid an interference between the workpiece and the front flange portion, and thus, it is possible to shorten a protrusion length of the tool.

In any one of the above-described main spindle units, the contact surface of the front flange portion may be a surface which extends in the axial direction such that the front case is movable relative to the motor case in the axial direction.

The main spindle unit may further include a movement restriction portion which restricts a movement amount of a relative movement of the rear case with respect to the main spindle in the axial direction in the main spindle unit in which the front case is movable relative to the motor case in the axial direction.

In the main spindle unit, in a case where the rear case moves in the axial direction, it is possible to move the main spindle in the axial direction according to the movement of the rear case.

In the main spindle unit which includes the movement restriction portion, the front bearing may be a bearing which receives a radial load and a thrust load with respect to the main spindle.

In the main spindle unit, the front bearing and the front case cannot move relative to the main spindle in the axial direction. Accordingly, in a case where the rear case moves in the axial direction, it is possible to move the main spindle, the front bearing, and the front case in the axial direction according to the movement of the rear case.

In order to achieve the object, according to another aspect of the present invention, there is provided a machine tool including: the main spindle unit according to any one of the above-described main spindle units; a unit support table; a workpiece holder which holds a workpiece which is a processing target; and a movement mechanism which moves the main spindle unit and the workpiece holder relative to each other.

In a machine tool industry, it is preferable that, even in a case where a workpiece which is a processing target has a complicated shape, a case of a main spindle unit does not interfere with the workpiece.

Accordingly, an object of the following invention is to provide a main spindle unit and a machine tool having the main spindle unit capable of suppressing the interference between the case of the main spindle unit and the workpiece, even in a case where the workpiece which is the processing target is large.

In order to achieve the object, according to still another aspect of the present invention, there is provided a main spindle unit including: a main spindle which extends in an axial direction, in which an axis extends, about the axis; a motor rotor which is fixed to an outer periphery of the main spindle; a motor stator which is disposed on an outer periphery of the motor rotor; a holder which is provided on a front side which is one end side of the main spindle in the axial direction and holds a tool; a front bearing which is disposed on the front side of the motor rotor and on a rear side of the holder, the rear side being a side opposite to the front side, and rotatably supports the main spindle; a rear bearing which is disposed on the rear side of the motor rotor and rotatably supports the main spindle; a motor case which has a tubular shape about the axis and in which the motor stator is fixed to an inner peripheral surface thereof; a front case which covers an outer periphery of the front bearing; and a rear case which is in contact with the motor case to cover an outer periphery of the rear bearing. The front case has a front body portion which covers the outer periphery of the front bearing to hold the front bearing and a front flange portion which extends radially outward with respect to the axis from a rear side rear end portion of the front body portion. An outer diameter of the front body portion is smaller than an inner diameter of the motor case, and the front flange portion is in contact with the motor case.

In the main spindle unit, the front flange portion of the front case extends radially outward from a rear end portion of the front body portion. Accordingly, in the main spindle unit, even in a case where a workpiece disposed on the front side of the main spindle unit has a complicated shape, it is possible to avoid an interference between the workpiece and the front flange portion, and it is possible to shorten the protrusion length of the tool. Accordingly, in the main spindle unit, it is possible to process a large workpiece.

Here, in the main spindle unit, in the front flange portion, a front mounted surface facing the front side and a bolt threaded hole which is recessed from the front mounted surface toward the rear side are formed.

In the main spindle unit, a bolt screw can be screwed into the bolt threaded hole of the front flange portion from the front side.

Moreover, in any one of the above-described main spindle units, in the front flange portion, a contact surface may be formed, which is in contact with the motor case such that the motor case can move relative to the front case in the axial direction.

A movement restriction portion which restricts a movement amount of a relative movement of the rear case with respect to the main spindle in the axial direction may be provided in the main spindle unit in which the contact surface is formed.

In the main spindle unit, in a case where the rear case moves in the axial direction, it is possible to move the main spindle in the axial direction according to the movement of the rear case.

In the main spindle unit which includes the movement restriction portion, the front bearing may be a bearing which receives a radial load and a thrust load with respect to the main spindle.

In the main spindle unit, the front bearing and the front case cannot move relative to the main spindle in the axial direction. Accordingly, in a case where the rear case moves in the axial direction, it is possible to move the main spindle, the front bearing, and the front case in the axial direction according to the movement of the rear case.

In order to achieve the object, according to still another aspect of the present invention, there is provided a machine tool including: the main spindle unit according to any one of the above-described main spindle units; a workpiece holder which holds a workpiece which is a processing target; and a movement mechanism which moves the main spindle unit and the workpiece holder relative to each other.

Advantageous Effects of Invention

According to the aspects of the present invention, it is possible to easily detach and attach the main spindle unit.

DESCRIPTION OF EMBODIMENTS

Hereinafter, various embodiments of a machine tool will be described with reference to the drawings.

First Embodiment

A first embodiment of a machine tool will be described with reference to FIGS. 1 to 7.

Figure 1:
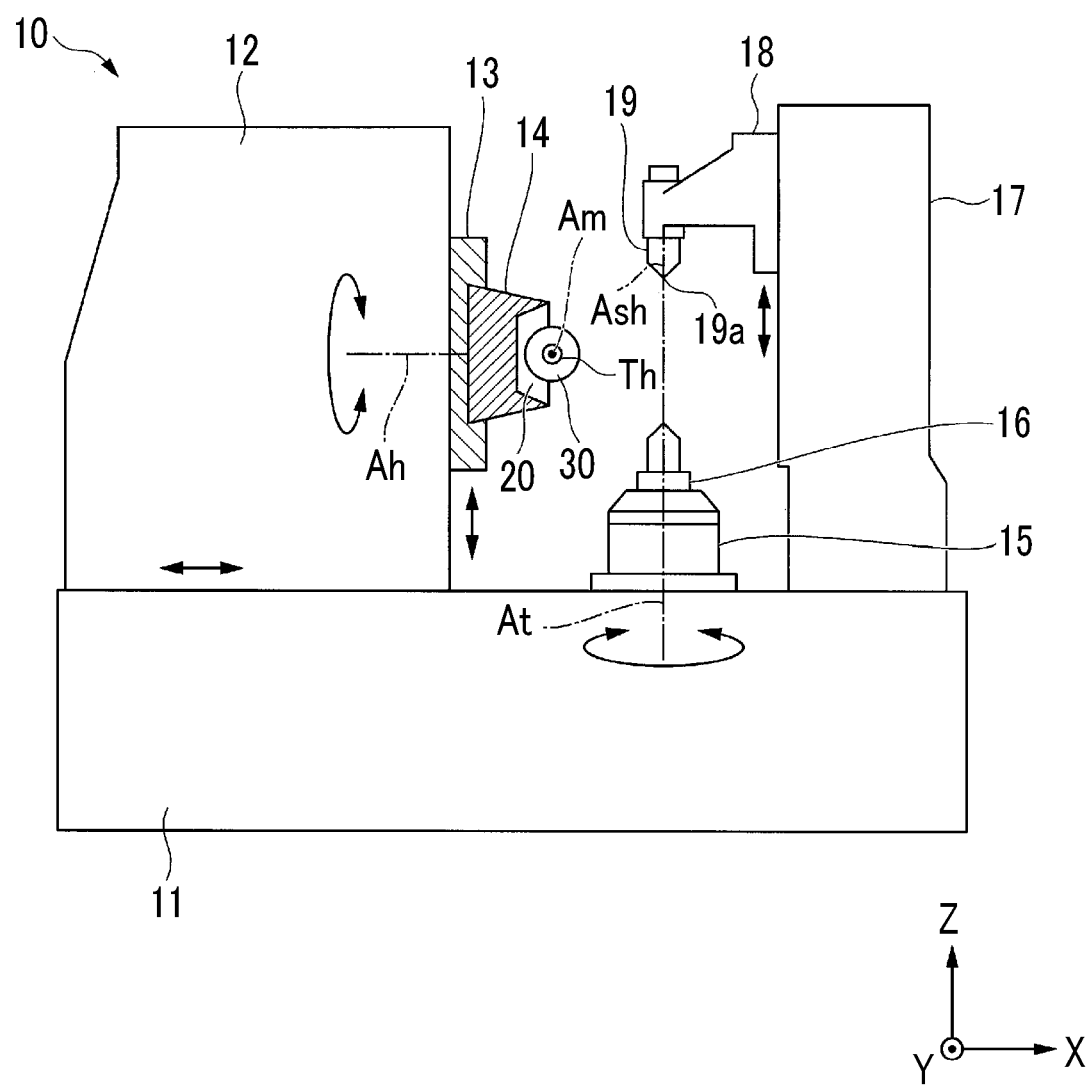
FIG. 1 is an overall side view of a machine tool in a first embodiment.

A machine tool of the present embodiment is a bobbing machine. As shown in FIG. 1, a machine tool 10 includes a bed 11, a hob column 12, a hob saddle 13, a hob head 14, a hob slider 20, a rotary table 15, a workpiece support 16, a support column 17, a support head 18, a center support 19, and a main spindle unit 30.

A hob column 12 extends in a vertical direction. Here, the vertical direction is referred to as a direction, a direction perpendicular to the Z direction is referred to as a Y direction, and a direction perpendicular to the Z direction and the Y direction is referred to as an X direction. The hob column 12 is attached to the bed 11 which is movable in the X direction. The hob saddle 13 is attached to the hob column 12 so as to be movable in the Z direction. The hob head 14 is attached to the hob saddle 13 so as to be rotatable around a head axis Ah extending in the X direction. The hob slider 20 is attached to the hob head 14 so as to be movable in a direction perpendicular to the head axis Ah.

The rotary table 15 is disposed on the bed 11 at a position separated from the hob column 12 in the X direction. The rotary table 15 is provided on the bed 11 so as to be rotatable about a table axis At extending in the Z direction. The workpiece support 16, which supports a workpiece W which is a gear material, is attached to the rotary table 15. The support column 17 is disposed on a side opposite to the hob column 12 in the X direction with reference to the rotary table 15 and is fixed to the bed 11. The support column 17 extends in the Z direction. The support head 18 is attached to the support column 17 so as to be movable in the Z direction. The center support 19 is attached to the support head 18. The center support 19 has a support end 19a which rotatably supports the workpiece W about a support head axis Ash. The support end 19a is positioned on the support head axis Ash. A workpiece holder is configured to have the workpiece support 16, the support column 17, the support head 18, and the center support 19.

Figure 2:
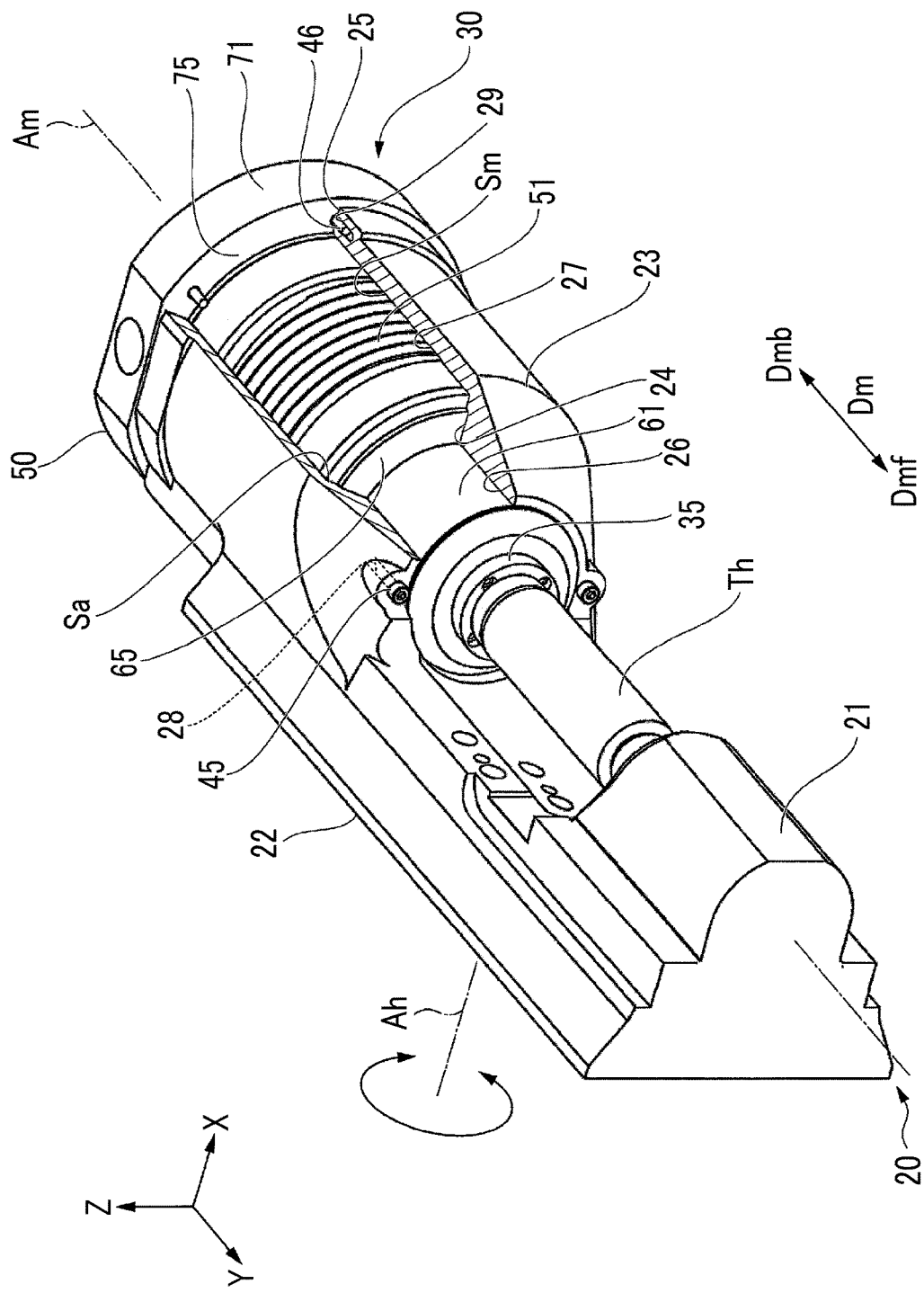
FIG. 2 is a perspective view of a main spindle unit and a hob slider in the first embodiment.
Figure 3:
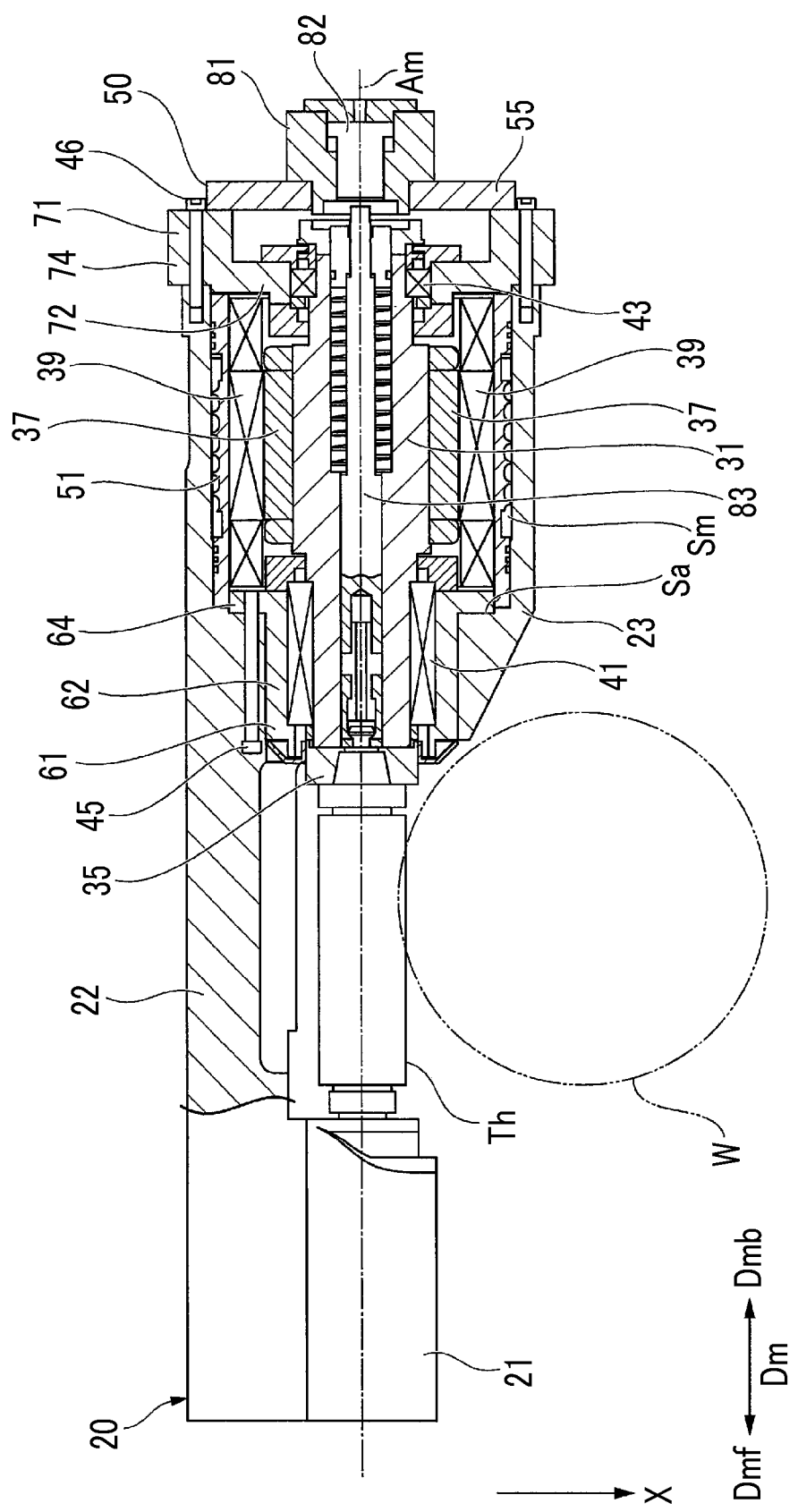
FIG. 3 is a partial sectional view of the main spindle unit and the hob slider in the first embodiment.

As shown in FIGS. 2 and 3, the hob slider 20 has a base 22 and a tool support 21 which is attached to the base 22. The base 22 extends in a main axis direction Dm in which a main axis Am perpendicular to the head axis Ah extends. Here, one side in the main axis direction Dm is referred to as a front side Dmf and the other side is referred to as a rear side Dmb. The tool support 21 is provided in a front side Dmf portion of the base 22. The tool support 21 supports one end of a hob cutter Th which is a tool such that the hob cutter Th can rotate around the main axis Am. The hob cutter Th is formed in a substantially cylindrical shape about a tool axis. The hob cutter Th rotates about the tool axis. In order words, the tool axis is a rotation center axis of the hob cutter Th. In the base 22, a main spindle unit accommodation portion 23 is provided in a rear side Dmb portion of the base 22. That is, the base 22 has the main spindle unit accommodation portion 23. A substantially cylindrical accommodation space Sa about the main axis Am is formed in the main spindle unit accommodation portion 23.

Figure 4:
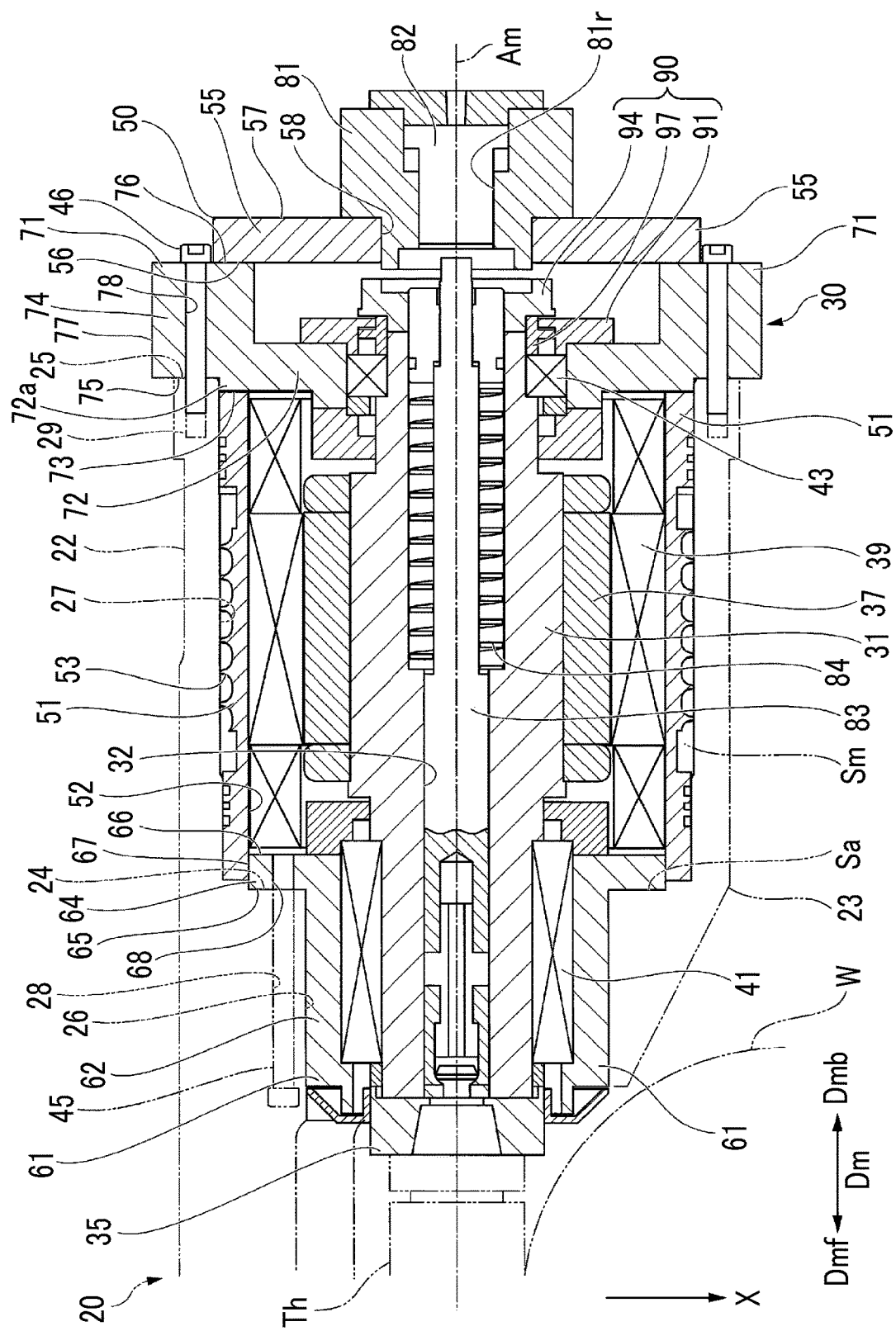
FIG. 4 is a sectional view of the main spindle unit in the first embodiment.

The main spindle unit 30 is accommodated in the accommodation space Sa in the main spindle unit accommodation portion 23 of the hob slider 20 and is attached to the main spindle unit accommodation portion 23. As shown in FIGS. 3 and 4, the main spindle unit 30 includes a main spindle 31, a motor rotor 37 which is fixed to an outer periphery of the main spindle 31, a motor stator 39 which is disposed on an outer periphery of the motor rotor 37, a collet chuck (or holder) 35 which holds the hob cutter Th which is a tool, a front bearing 41 and a rear bearing 43 which rotatably support the main spindle 31, and a case 50.

The main spindle 31 has a columnar shape which extends in the main axis direction Dm about the main axis Am. The collet chuck 35 is attached to a front side Dmf end of the main spindle 31. The front bearing 41 is disposed between the collet chuck 35 and the motor rotor 37 in the main axis direction Dm. The rear bearing 43 is disposed on the rear side Dmb of the motor rotor 37. Both the front bearing 41 and the rear bearing 43 rotatably support the main spindle 31 about the main axis Am. The front bearing 41 receives a radial load and a thrust load from the main spindle 31. The rear bearing 43 is a radial bearing which exclusively receives the radial load from the main spindle 31. Therefore, the front bearing 41 is provided so as to be relatively immovable to main spindle in the main axis direction Dm (thrust direction).

Figure 5:
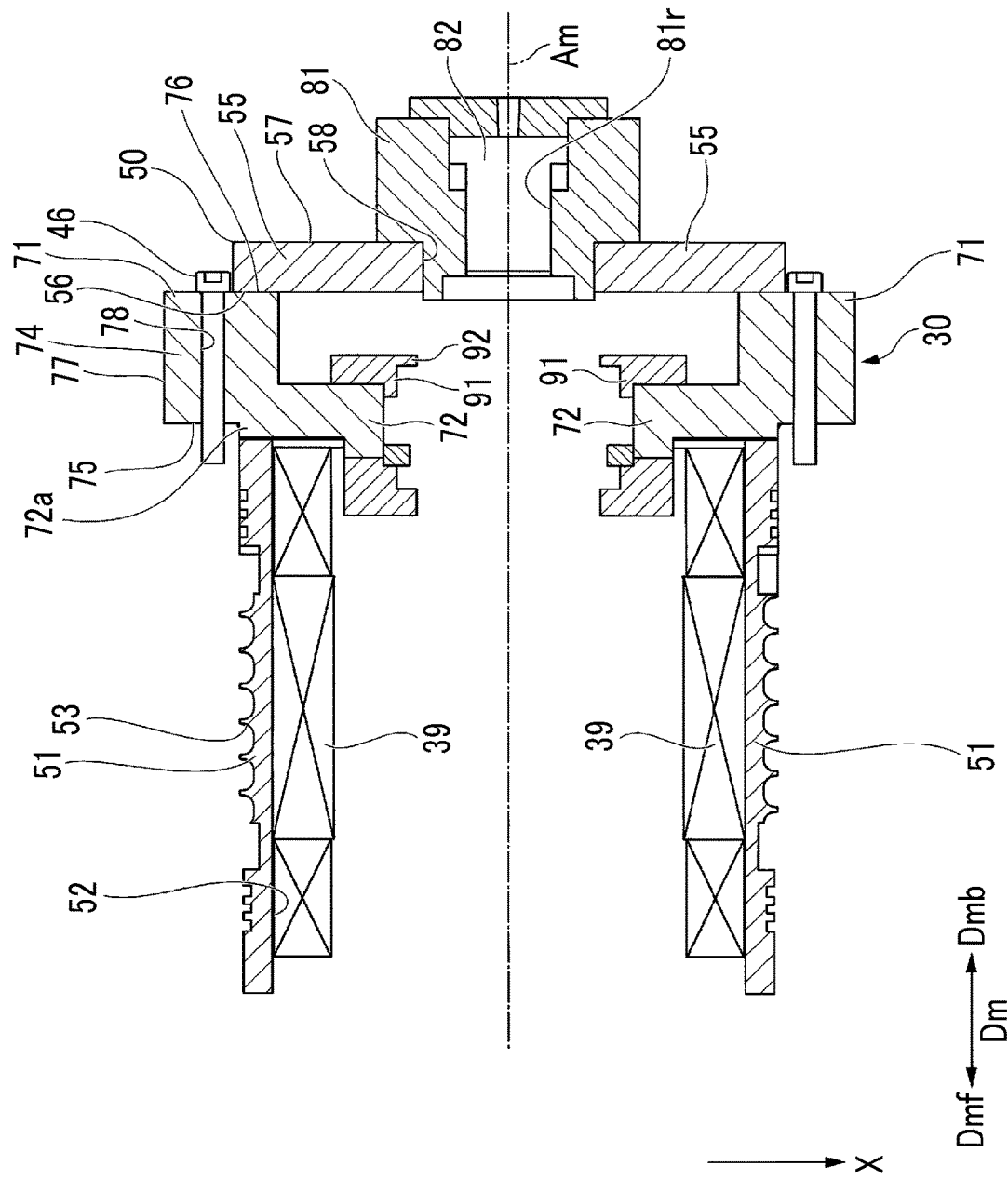
FIG. 5 is a sectional view of a portion including a motor case in the main spindle unit in the first embodiment.

As shown in FIGS. 2 and 3, the case 50 has a motor case 51, a front case 61, a rear case 71, and a lid 55. As shown in FIGS. 4 and 5, the motor case 51 covers an outer peripheral side of the motor stator 39. The motor case 51 has a substantially cylindrical shape about the main axis Am. An inner peripheral surface 52 of the motor case 51 extends in a circumferential direction about the main axis Am and extends in the main axis direction Dm. The inner peripheral surface 52 is fixed to the motor stator 39. In addition, a cooling fin 53 is formed on an outer peripheral side of the motor case 51.

Figure 6:
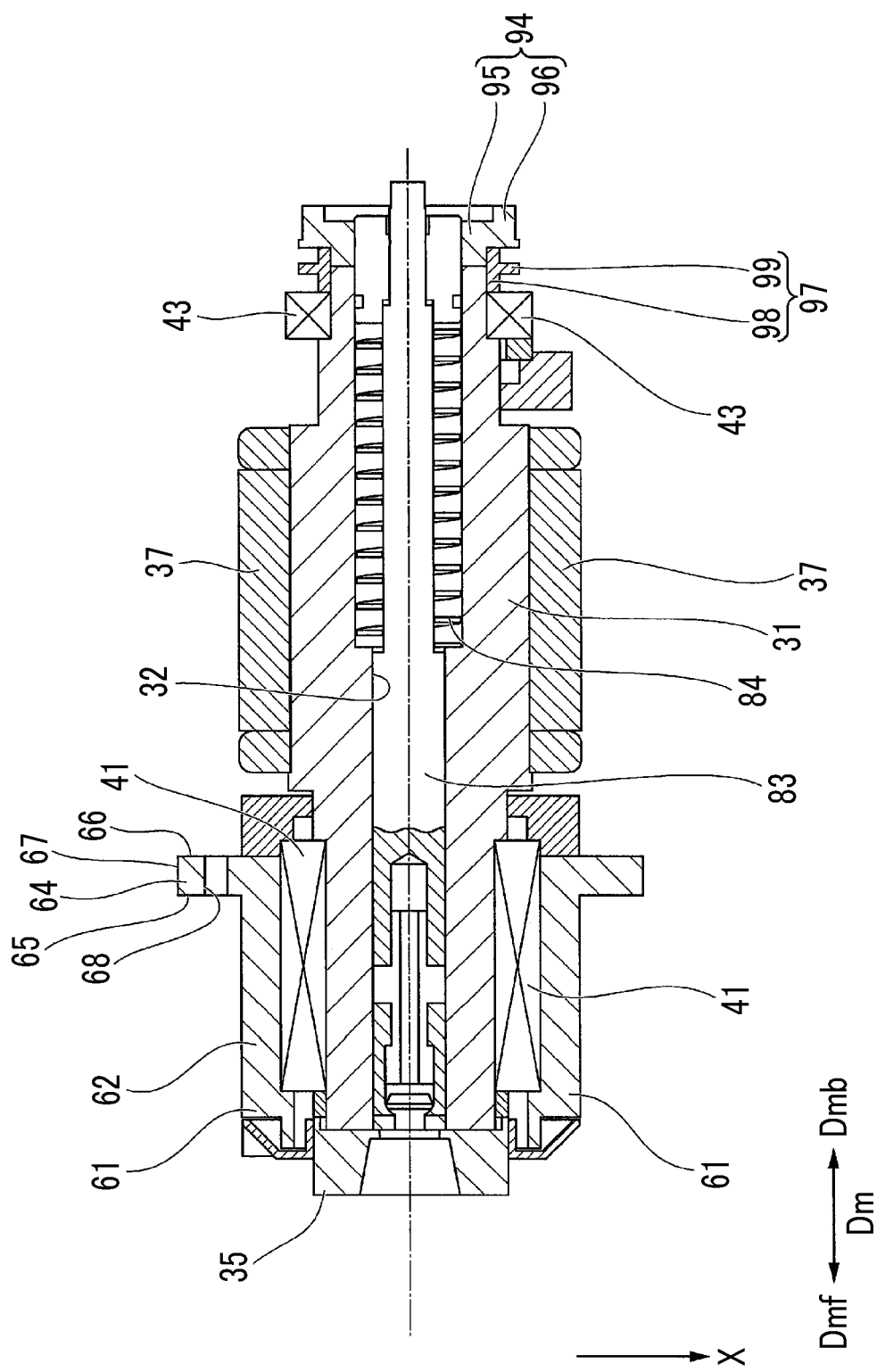
FIG. 6 is a sectional view of a portion including a main spindle in the main spindle unit in the first embodiment.

As shown in FIGS. 4 and 6, the front case 61 covers an outer peripheral side of the front bearing 41. The front case 61 has a front body portion 62 which has a cylindrical shape about the main axis Am and a front flange portion 64. The front body portion 62 holds the front bearing 41 on an inner peripheral side of the front body portion 62. An outer diameter of the front body portion 62 is smaller than an inner diameter of the motor case 51. The front flange portion 64 extends radially outward with respect to the main axis Am from a portion including a rear side Dmb end of the front body portion 62. In the front flange portion 64, a front mounted surface 65 facing the front side Dmf, an inner surface 66 facing the rear side Dmb, and an outer peripheral surface 67 facing radially outward are formed. In addition, a bolt threaded hole 68 is formed in the front flange portion 64. An outer peripheral surface 67 of the front flange portion 64 is in contact with the inner peripheral surface 52 of the motor case 51. That is, the outer peripheral surface 67 forms a contact surface. The contact surface 67 which is the outer peripheral surface extends in the circumferential direction about the main axis Am and extends in the main axis direction Dm. The inner peripheral surface 52 of the motor case 51 is in contact with only the contact surface 67 of respective surfaces of the front flange portion 64. Accordingly, the motor case 51 can move relative to the front flange portion 64 in the main axis direction Dm.

As shown in FIGS. 4 and 5, the rear case 71 covers an outer peripheral side of the rear bearing 43. The rear case 71 has a rear body portion 72 which has an annular shape about the main axis Am and a rear flange portion 74 which extends radially outward with respect to the main axis Am from an outer periphery of the rear body portion 72. The rear body portion 72 holds the rear bearing 43 on an inner peripheral side of the rear body portion 72. The rear body portion 72 has a columnar fitting portion 72a which fits within the accommodation space Sa of the main spindle unit accommodation portion 23. An outer diameter of the fitting portion 72a of the rear body portion 72 is substantially the same as an outer diameter of the motor case 51. A surface 73 facing the front side Dmf is formed in the rear body portion 72. This surface 73 is in contact with a rear end surface of the motor case 51. Accordingly, this surface 73 forms a contact surface. In the rear flange portion 74, a rear mounted surface 75 facing the front side Dmf, a lid mounting surface 76 facing the rear side Dmb, and an outer peripheral surface 77 facing radially outward are formed. Moreover, a bolt insertion hole 78 penetrating the rear flange portion 74 from the rear mounted surface 75 to the lid mounting surface 76 is formed in the rear flange portion 74. The rear body portion 72 of the rear flange portion 74 and the motor case 51 are connected to a bolt screw (not shown).

As shown in FIGS. 4 and 5, the lid 55 closes a rear side Dmb opening of the rear case 71. This lid 55 has a columnar shape about the main axis Am. An inner surface 56 facing the front side Dmf, an outer surface 57 facing the rear side Dmb, and a through-hole 58 penetrating the lid 55 from the inner surface 56 to the outer surface 57 are formed in the lid 55. The inner surface 56 of the lid 55 is in contact with the lid mounting surface 76 of the rear case 71. The through-hole 58 has a columnar shape about the main axis Am. The lid 55 and the rear body portion 72 of the rear flange portion 74 are connected to each other by a bolt screw (not shown).

In addition, the main spindle unit 30 has a cylinder 81, a piston 82, a clamp rod 83, and a coil spring 84. The cylinder 81 is fixed to the outer surface 57 of the lid 55. A portion of the cylinder 81 is inserted into the through-hole 58 of the lid 55. In the cylinder 81, a columnar cylinder chamber 81r is formed about the main axis Am. The piston 82 is disposed in the cylinder chamber 81r so as to be movable in the main axis direction Dm. In the main spindle 31, a columnar rod chamber 32 is formed about the main axis Am. The clamp rod 83 is disposed in the rod chamber 32 to be movable in the main axis direction Dm. The coil spring 84 is disposed on an outer peripheral side of the clamp rod 83 in the rod chamber 32. The coil spring 84 biases the clamp rod 83 to the rear side Dmb. If oil flows into the cylinder chamber 81r, the piston 82 pushes the clamp rod 83 toward the front side Dmf against a biasing force of the coil spring 84. The collet chuck (or holder) 35 holds and releases the other end of the hob cutter Th by a movement of the clamp rod 83 in the main axis direction Dm.

Figure 7:
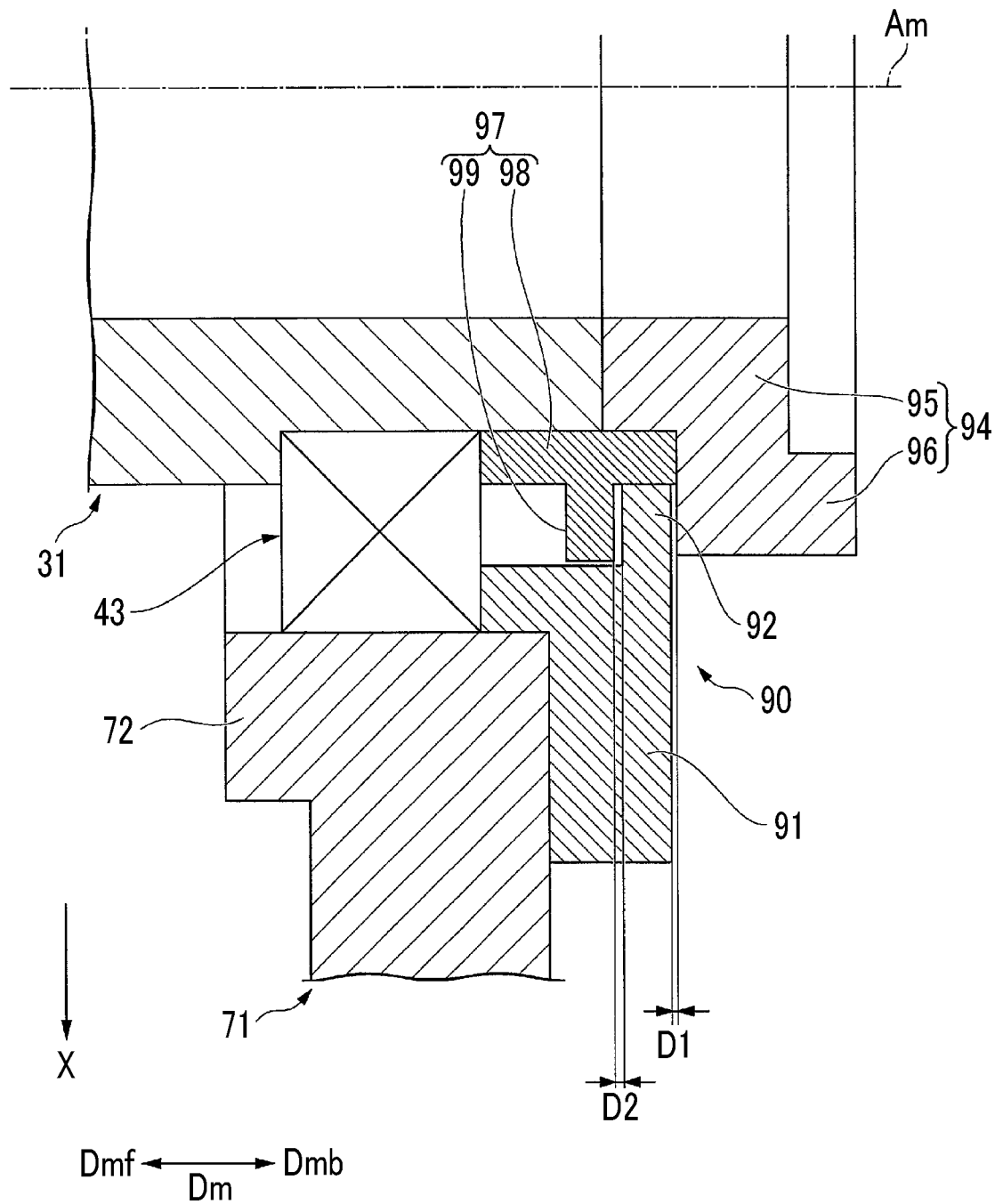
FIG. 7 is a sectional view of a movement restriction portion in the first embodiment.

In addition, as shown in FIGS. 4 and 7, the main spindle unit 30 includes a movement restriction portion 90 which restricts a movement amount of a relative movement of the main spindle 31 with respect to the rear case 71 in the main axis direction Dm. The movement restriction portion 90 has a stopper ring 91 which is fixed to the rear body portion 72 of the rear case 71, a first facing ring 94 which is fixed to a rear end of the main spindle 31, and a second facing ring 97 which is fixed to an outer periphery of the main spindle 31. Each of the stopper ring 91, the first facing ring 94, and the second facing ring 97 has an annular shape about the main axis Am. The stopper ring 91 has a receiving portion 92 which protrudes radially inward from the inner peripheral surface of the rear body portion 72.

The first facing ring 94 has a first shaft contact portion 95 and a first facing portion 96. The first shaft contact portion 95 has an outer diameter which is the same as an outer diameter of a rear end of the main spindle 31 and is connected to the rear end of the main spindle 31. The first facing portion 96 protrudes radially outward from the first shaft contact portion 95, is positioned on the rear side Dmb of the receiving portion 92, and faces the receiving portion 92 in the main axis direction Dm. In a state where the case 50 of the main spindle unit 30 is fixed to the hob slider 20, basically, there is a clearance D1 between the receiving portion 92 of the stopper ring 91 and the first facing portion 96 of the first facing ring 94. The second facing ring 97 has a second shaft contact portion 98 and a second facing portion 99. The second shaft contact portion 98 has an inner diameter which is the same as an outer diameter of the rear end of the main spindle 31. The second facing portion 99 protrudes radially outward from the second shaft contact portion 98, is positioned on the front side Dmf of the receiving portion 92, and faces the receiving portion 92 in the main axis direction Dm. In a state where the main spindle unit 30 is fixed to the hob slider 20, basically, there is a clearance D2 between the receiving portion 92 of the stopper ring 91 and the second facing portion 99 of the second facing ring 97. That is, the receiving portion 92 of the stopper ring 91 is positioned between the first facing portion 96 of the first facing ring 94 and the second facing portion 99 of the second facing ring 97 in the main axis direction Dm.

As shown in FIGS. 2 to 4, the main spindle unit accommodation portion 23 of the hob slider 20 has a first mounting surface 24 and the second mounting surface 25 facing the rear side Dmb, a first inner peripheral surface and a second inner peripheral surface 27 facing radially inward with respect to the main axis Am, a bolt insertion hole 28, and a bolt threaded hole 29. The second mounting surface 25 forms the most rear side Dmb rear end surface of the base 22 of the hob slider 20. In a state where the main spindle unit 30 is attached to the base 22, the second mounting surface 25 is in contact with the rear mounted surface 75 in the rear flange portion 74 of the main spindle unit 30. The bolt threaded hole 29 is processed from the second mounting surface 25 toward the front side Dmf. The first inner peripheral surface 26, the second inner peripheral surface 27, and the first mounting surface 24 are surfaces which define the accommodation space Sa. The second inner peripheral surface 27 is positioned on the front side Dmf of the second mounting surface 25 and is connected to the second mounting surface 25. In the state where the main spindle unit 30 is attached to the base 22, the second inner peripheral surface 27 faces the motor case 51 of the main spindle unit 30. A refrigerant space Sm is formed between the second inner peripheral surface 27 and the motor case 51. The first mounting surface 24 is positioned on the front side Dmf of the second inner peripheral surface 27 and radially inside the second inner peripheral surface 27 with respect to the main axis Am. In the state where the main spindle unit 30 is attached to the base 22, the first mounting surface 24 is in contact with the front mounted surface 65 in the front flange portion 64 of the main spindle unit 30. The bolt insertion hole 28 penetrates the first mounting surface 24 from a front surface of the main spindle unit accommodation portion 23. The first inner peripheral surface 26 is positioned on the front side Dmf of the first mounting surface 24 and radially inside the first mounting surface 24 with respect to the main axis Am and is connected to the first mounting surface 24. In the state where the main spindle unit 30 is attached to the base 22, the first inner peripheral surface 26 faces an outer peripheral surface of the front body portion 62 of the main spindle unit 30.

The main spindle unit 30 is accommodated in the accommodation space Sa of the hob slider 20, and thereafter, is fixed to the base 22 of the hob slider 20. In a state where the main spindle unit 30 is accommodated in the accommodation space Sa, as described above, the front mounted surface 65 in the front flange portion 64 of the main spindle unit 30 faces the first mounting surface 24 of the hob slider 20 in the main axis direction Dm, and the rear mounted surface 75 in the rear flange portion 74 of the main spindle unit 30 faces the second mounting surface 25 of the hob slider 20 in the main axis direction Dm. When the main spindle unit 30 received in the accommodation space Sa is fixed to the base 22 of the hob slider 20, a second fixing bolt 46 is inserted into the bolt insertion hole 78 of the rear case 71 from the rear side Dmb of the main spindle unit 30, and a screw portion of the second fixing bolt 46 is screwed into the bolt threaded hole 29 of the base 22. As a result, the rear mounted surface 75 in the rear flange portion 74 of the main spindle unit 30 comes into contact with the second mounting surface 25 of the hob slider 20. In addition, a first fixing bolt 45 is inserted into the bolt insertion hole 28 of the main spindle unit accommodation portion 23 from the front side Dmf of the main spindle unit accommodation portion 23, and a screw portion of the first fixing bolt 45 is screwed into the bolt threaded hole 68 of the front case 61. As a result, the front mounted surface 65 in the front flange portion 64 of the main spindle unit 30 comes into contact with the first mounting surface 24 of the hob slider 20. In this state, a distance of the main spindle unit 30 from the front mounted surface 65 to the rear mounted surface 75 in the main axis direction Dm completely coincides with a distance of the hob slider 20 from the first mounting surface 24 to the second mounting surface 25 in the main axis direction Dm.

If the rear case 71 in which the rear mounted surface 75 and the motor case 51 are connected to each other by a bolt screw, and the front case 61 in which the front mounted surface 65 is formed and the motor case 51 are connected to each other by a bolt screw. In this case, due to a manufacturing error of each case 50 or the like, it is substantially impossible to completely coincide the distance of the main spindle unit 30 from the front mounted surface 65 to the rear mounted surface 75 and the distance of the hob slider 20 from the first mounting surface 24 to the second mounting surface 25 with each other. Accordingly, in the present embodiment, the front case 61 can move relative to the motor case 51 in the main axis direction Dm.

When the main spindle unit 30 is detached from the hob slider 20 due to a failure of the main spindle unit 30 or the like, the first fixing bolt 45 is removed from the front side Dmf of the main spindle unit accommodation portion 23 toward the front side Dmf. Continuously, the second fixing bolt 46 is removed from the rear side Dmb of the main spindle unit 30 toward the rear side Dmb. In addition, the rear case 71 of the main spindle unit 30 is held and the main spindle unit 30 is pulled out from the accommodation space Sa toward the rear side Dmb. Accordingly, removal of the main spindle unit 30 is completed.

Meanwhile, as described above, the front case 61 can move relative to the motor case 51 in the main axis direction Dm. Accordingly, even when the rear case 71 which is connected to the motor case 51 by the bolt screw is pulled toward the rear side Dmb, there is a concern that the front case 61 remains in the accommodation space Sa. Accordingly, as described above, the main spindle unit 30 of the present embodiment includes the movement restriction portion 90 which restricts the movement amount of the relative movement of the main spindle 31 with respect to the rear case 71 in the main axis direction Dm. Accordingly, if the rear case 71 is held and the rear case is pulled toward the rear side Dmb, the receiving portion 92 of the stopper ring 91 of the movement restriction portion 90 fixed to the rear case 71 comes into contact with the first facing portion 96 of the first facing ring 94 fixed to the main spindle 31. As a result, if the rear case 71 is further pulled toward the rear side Dmb, the main spindle 31 moves toward the rear side Dmb according to the movement of the rear case 71 toward the rear side Dmb. As described above, the main spindle 31 and the front bearing 41 do not move relative to each other in the main axis direction Dm. In addition, the front bearing 41 is held by the front case 61, and thus, the front bearing 41 and the front case 61 do not move relative to each other in the main axis direction Dm. Accordingly, if the main spindle 31 moves toward the rear side Dmb, the front bearing 41 and the front case 61 are also moved toward the rear side Dmb according to the movement of the main spindle 31. Accordingly, if the rear case 71 is held and the rear case 71 is pulled toward the rear side Dmb, the entire main spindle unit 30 moves toward the rear side Dmb.

As described above, in the present embodiment, both the first mounting surface 24 and the second mounting surface 25 of the hob slider (unit support table 20) face toward the rear side Dmb. In addition, both the front mounted surface 65 of the main spindle unit 30 facing the first mounting surface 24 in the main axis direction Dm and the rear mounted surface 75 of the main spindle unit 30 facing the second mounting surface 25 in the main axis direction Dm face the front side Dmf. Accordingly, when the main spindle unit 30 is removed from the hob slider 20, it is possible to separate the main spindle unit 30 toward the rear side Dmb from the main spindle unit accommodation portion 23 of the hob slider 20 without disassembling the main spindle unit 30. Therefore, in the present embodiment, it is possible to easily detach the main spindle unit 30 from the hob slider 20. Moreover, in the present embodiment, the main spindle unit 30 can be attached to the hob slider 20 in a state where the main spindle unit 30 is assembled, and thus, it is possible to easily attach the main spindle unit 30 to the hob slider 20.

Moreover, in the present embodiment, as shown in FIG. 4, the front flange portion 64 of the front case 61 extends radially outward from the portion including the rear side Dmb end of the front body portion 62. Accordingly, even in a case where the workpiece W disposed on the front side Dmf of the main spindle unit 30 is large, it is possible avoid an interference between the workpiece W and the front flange portion 64. In other words, in the present embodiment, it is possible to process a large workpiece W.

Second Embodiment

Figure 8:
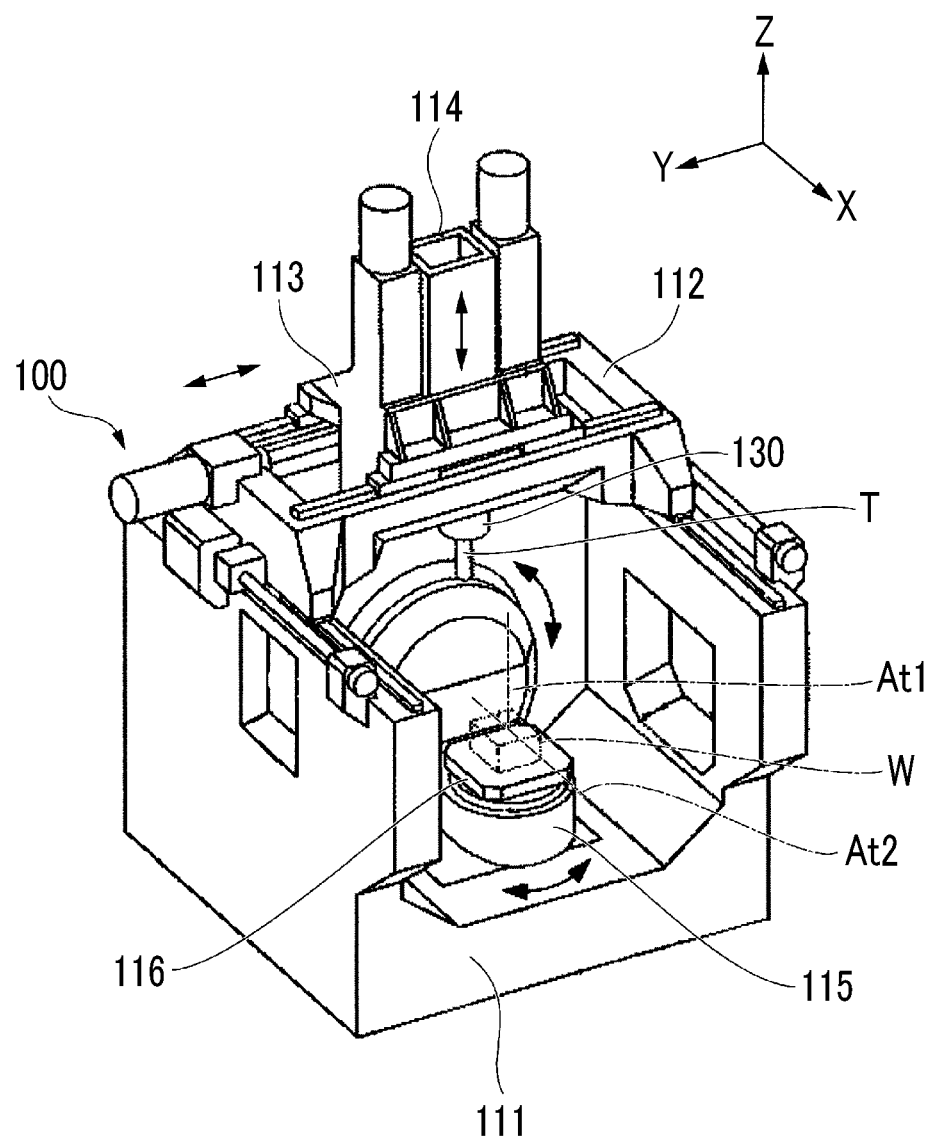
FIG. 8 is an overall schematic view of a machine tool in a second embodiment.

A second embodiment of the machine tool will be described with reference to FIGS. 8 to 10.

The machine tool of the present embodiment is a machining center. As shown in FIG. 8, a machine tool 100 includes a bed 111, a first saddle 112, a second saddle 113, a head 114, a rotary table 115, a pallet 116, and a main spindle unit 130.

The first saddle 112 is attached to the bed 111 so as to be movable in an X direction which is a horizontal direction. The second saddle 113 is attached to the first saddle 112 so as to be movable in a Y direction which is perpendicular to the X direction and the horizontal direction. The head 114 is attached to the second saddle 113 so as to be movable in a Z direction perpendicular to the X direction and the Y direction. The main spindle unit 130 is fixed to the head 114. The rotary table 115 is attached to the bed 111 to be rotatable about a first table axis At1 extending in the Z direction and to be rotatable about a second table axis At2 extending in the direction. The pallet (workpiece holder) 116 holds the workpiece W which is a processing target. The pallet 116 is attached to the rotary table 115.

Although not shown in the drawings, the machine tool 100 of the present embodiment includes a tool exchanging device which automatically exchanges a tool which is attached the main spindle unit 130 and a pallet exchanging device which automatically exchanges the pallet 116.

Figure 9:
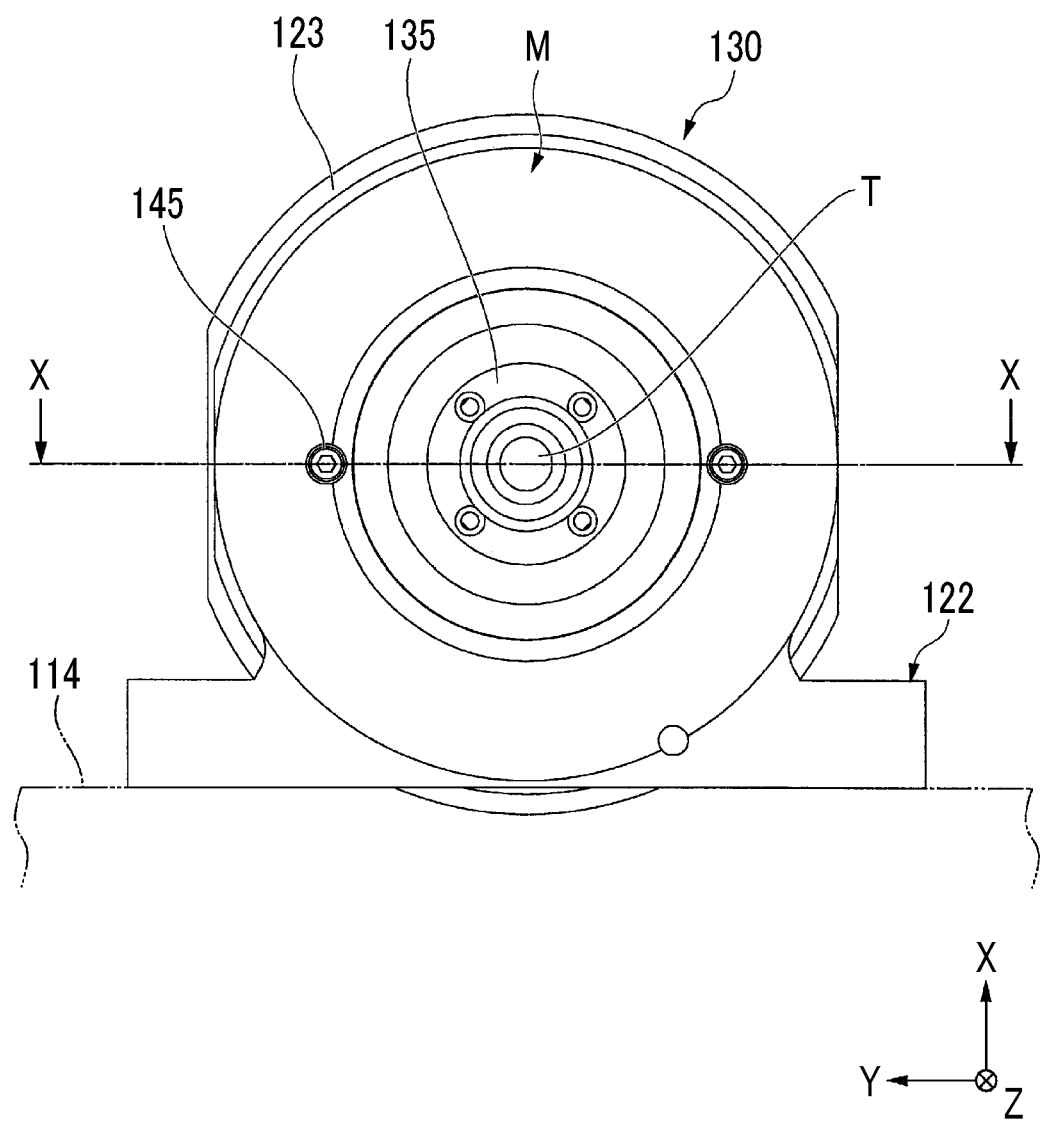
FIG. 9 is a front view of a main spindle unit in the second embodiment.
Figure 10:
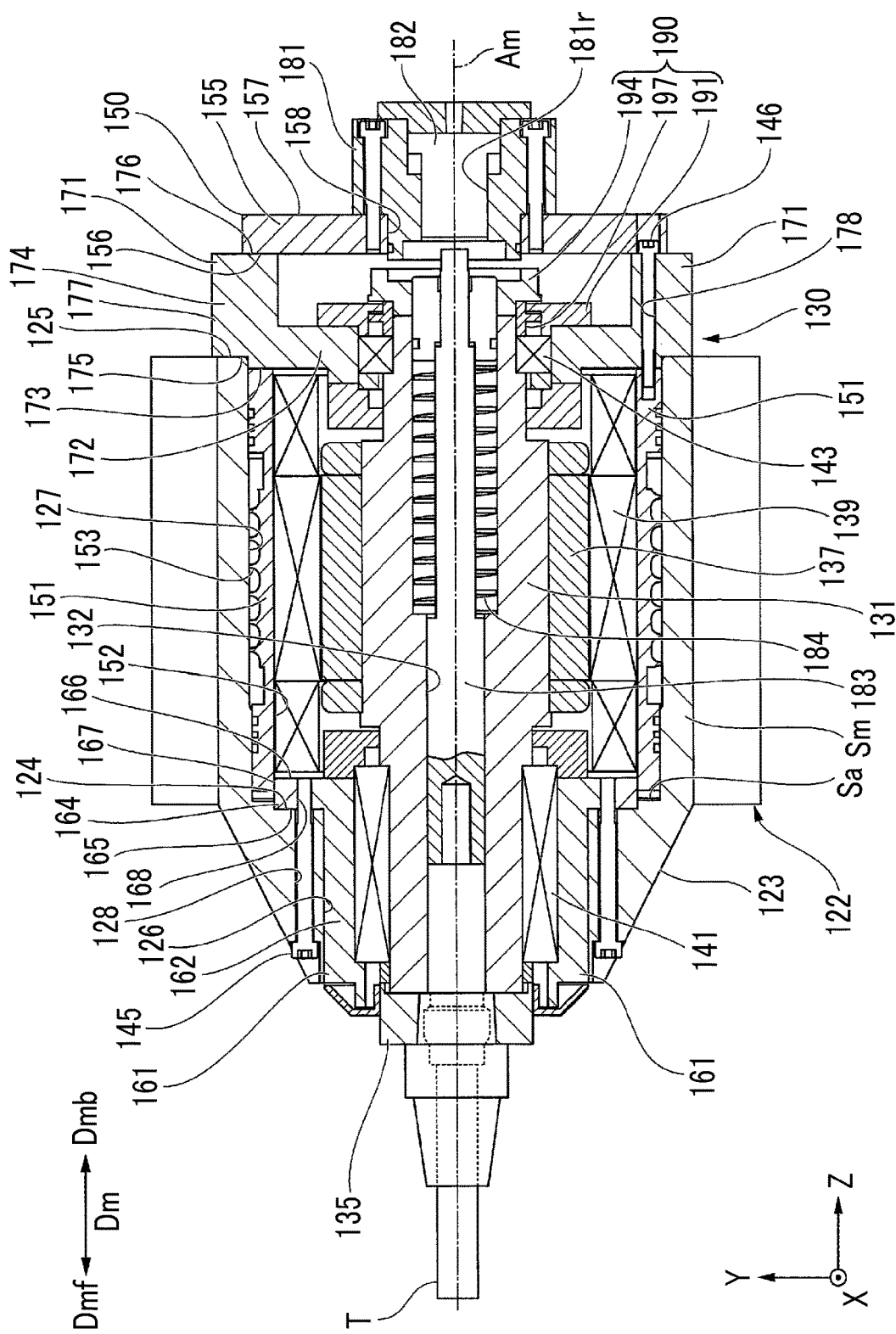
FIG. 10 is a sectional view of the main spindle unit in the second embodiment.

As shown in FIGS. 9 and 10, the main spindle unit 130 includes a main spindle unit body N and a fixing frame 122 for fixing the main spindle unit body N to the head 114. Similarly to the main spindle unit 30 of the first embodiment, the main spindle unit body N includes a main spindle 131, a motor rotor 137 which is fixed to an outer periphery of the main spindle 131, a motor stator 139 which is disposed on an outer periphery of the motor rotor 137, a collet chuck (or holder) 135 which holds a tool T, a front bearing 141 and a rear bearing 143 which rotatably support the main spindle 131, and a case 150.

The main spindle 131 has a columnar shape which extends in the main axis direction Dm about the main axis Am extending in the Z direction. The collet chuck 135 is attached to a front side Dmf end of the main spindle 131. The front bearing 141 is disposed between the collet chuck 135 and the motor rotor 137 in the main axis direction Dm. The rear bearing 143 is disposed on the rear side Dmb of the motor rotor 137. Both the front bearing 141 and the rear bearing 143 rotatably support the main spindle 131 about the main axis Am. The front bearing 141 receives a radial load and a thrust load from the main spindle 131. The rear bearing 143 is a radial bearing which exclusively receives the radial load from the main spindle 131.

The case 150 has a motor case 151, a front case 161, a rear case 171, and a lid 155. The motor case 151 covers an outer peripheral side of the motor stator 139. The motor case 151 has a substantially cylindrical shape about the main axis Am. The motor stator 139 is fixed to an inner peripheral surface 152 of the motor case 151. In addition, a cooling fin 153 is formed on an outer peripheral side of the motor case 151.

The front case 161 covers an outer peripheral side of the front bearing 141. The front case 161 has a front body portion 162 which has a cylindrical shape about the main axis Am and a front flange portion 164 which extends radially outward with respect to the main axis Am from an outer periphery of the front body portion 162. The front body portion 162 holds the front bearing 141 on an inner peripheral side of the front body portion 162. An outer diameter of the front body portion 162 is smaller than an inner diameter of the motor case 151. The front flange portion 164 extends radially outward from a portion including a rear side Dmb end of the front body portion 162. In the front flange portion 164, a front mounted surface 165 facing the front side Dmf, an inner surface 166 facing the rear side Dmb, and an outer peripheral surface 167 facing radially outward are formed. In addition, a bolt threaded hole 168 which is recessed from the front mounted surface 165 toward the rear side Dmb is formed the front flange portion 164. An outer peripheral surface 167 of the front flange portion 164 is in contact with the inner peripheral surface 152 of the motor case 151. That is, the outer peripheral surface 167 forms a contact surface. The inner peripheral surface 152 of the motor case 151 is in contact with only the contact surface 167 which is an outer peripheral surface of each surface of the front flange portion 164. Accordingly, the motor case 151 can move relative to the front flange portion 164 in the main axis direction Dm.

The rear case 171 covers an outer peripheral side of the rear bearing 143. The rear case 171 has a rear body portion 172 which has an annular shape about the main axis Am and a rear flange portion 174 which extends radially outward with respect to the main axis Am from an outer periphery of the rear body portion 172. The rear body portion 172 holds the rear bearing 143 on an inner peripheral side of the rear body portion 172. An outer diameter of the rear body portion 172 is substantially the same as an outer diameter of the motor case 151. A surface 173 facing the front side Dmf is formed in the rear body portion 172. This surface 173 is in contact with a rear end surface of the motor case 151. Accordingly, this surface 173 forms a contact surface. In the rear flange portion 174, a rear mounted surface 175 facing the front side Dmf, a lid mounting surface 176 facing the rear side Dmb, and an outer peripheral surface 177 facing radially outward are formed. Moreover, a bolt insertion hole 178 penetrating the rear flange portion 174 from the rear mounted surface 175 to the lid mounting surface 176 is formed in the rear flange portion 174.

The lid 155 closes a rear side Dmb opening of the rear case 171. This lid 155 has a columnar shape about the main axis Am. An inner surface 156 facing the front side Dmf, an outer surface 157 facing the rear side Dmb, and a through-hole 158 penetrating the lid 155 from the inner surface 156 to the outer surface 157 are formed in the lid 155. The inner surface 156 of the lid 155 is in contact with the lid mounting surface 176 of the rear case 171. The through-hole 158 has a columnar shape about the main axis Am. The lid 155, the rear body portion 172 of the rear flange portion 174, and the motor case 151 are connected to each other by a bolt screw 146.

Similarly to the main spindle unit 30 of the first embodiment, the main spindle unit body M has a cylinder 181, a piston 182, a clamp rod 183, and a coil spring 184. The clamp rod 183 and the coil spring 184 are disposed in the rod chamber 132 of the main spindle 131. The coil spring 184 biases the clamp rod 183 toward the rear side Dmb. If oil flows into the cylinder chamber 181r, the piston 182 pushes the clamp rod 183 toward the front side Dmf against a biasing force of the coil spring 184. The collet chuck (or holder) 135 holds and releases the tool T by a movement of the clamp rod 183 in the main axis direction Dm.

The main spindle unit body M includes a movement restriction portion 190 which restricts a movement amount of a relative movement of the main spindle 131 with respect to the rear case 171 in the main axis direction Dm. Similarly to the movement restriction portion 90 of the first embodiment, the movement restriction portion 190 has a stopper ring 191 which is fixed to the rear body portion 172 of the rear case 171, a first facing ring 194 which is fixed to a rear end of the main spindle 131, and a second facing ring 197 which is fixed to an outer periphery of the main spindle 131.

The fixing frame 122 has a main body accommodation portion 123 which accommodates the main spindle unit body M. In the main body accommodation portion 123, an accommodation space Sa having a substantially columnar shape about the main axis Am is formed. Similarly to the main spindle unit accommodation portion 23 of the first embodiment, the main body accommodation portion 123 has a first mounting surface 124 and the second mounting surface 125 facing the rear side Dmb, a first inner peripheral surface 126 and a second inner peripheral surface 127 facing radially inward with respect to the main axis Am, and a bolt insertion hole 128. The second mounting surface 125 forms the most rear side Dmb rear end surface of the fixing frame 122. In a state where the main spindle unit body M is attached to the fixing frame 122, the second mounting surface 125 is in contact with the rear mounted surface 175 in the rear flange portion 174 of the main spindle unit body M. The first inner peripheral surface 126, the second inner peripheral surface 127, and the first mounting surface 124 are surfaces which define the accommodation space Sa. The second inner peripheral surface 127 is positioned on the front side Dmf of the second mounting surface 125 and is connected to the second mounting surface 125. In the state where the main spindle unit body M is attached to the fixing frame 122, the second inner peripheral surface 127 faces the motor case 151 of the main spindle unit body M. A refrigerant space Sm is formed between the second inner peripheral surface 127 and the motor case 151. The first mounting surface 124 is positioned on the front side Dmf of the second inner peripheral surface 127 and radially inside the second inner peripheral surface 127 with respect to the main axis Am. In the state where the main spindle unit body M is attached to the fixing frame 122, the first mounting surface 124 is in contact with the front mounted surface 165 in the front flange portion 164 of the main spindle unit body M. The bolt insertion hole 128 penetrates the first mounting surface 124 from a front surface of the main body accommodation portion 123. The first inner peripheral surface 126 is positioned on the front side Dmf of the first mounting surface 124 and radially inside the first mounting surface 124 with respect to the main axis Am and is connected to the first mounting surface 124. In the state where the main spindle unit body M is attached to the fixing frame 122, the first inner peripheral surface 126 faces an outer periphery of the front body portion 162 of the main spindle unit body M.

The main spindle unit body M is accommodated in the accommodation space Sa of the fixing frame 122, and thereafter, is fixed to the fixing frame 122 by a fixing bolt 145. The fixing bolt 145 is inserted into the bolt insertion hole 128 of the fixing frame 122 from the front side Dmf of the fixing frame 122, and is screwed into the bolt threaded hole 168 of the front case 161.

Moreover, in the present embodiment, as shown in FIG. 10, the front flange portion 164 of the front case 161 extends radially outward from the portion including the rear side Dmb end of the front body portion 162. Accordingly, even in a case where the workpiece W disposed on the front side Dmf of the main spindle unit 130 is large, it is possible avoid an interference between the workpiece W and the front flange portion 164, and it is possible to shorten a protrusion length of the tool.

INDUSTRIAL APPLICABILITY

According to an aspect of the present invention, it is possible to easily detach and attach a main spindle unit.

REFERENCE SIGNS LIST 10, 100: machine tool
11, 111: bed
12: hob column
112: first saddle
13: hob saddle
113: second saddle
14: hob head
114: head
15, 115: rotary table
16: workpiece support
116: pallet (workpiece holder)
17: support column
18: support head
19: center support
19a: support end
20: hob slider (unit support table)
21: tool support
22: base
122: fixing frame
23: main spindle unit accommodation portion
123: main body accommodation portion
24, 124: first mounting surface
25, 125: second mounting surface
26, 126: first inner peripheral surface
27, 127: second inner peripheral surface
28, 128: bolt insertion hole
29: bolt threaded hole
30, 130: main spindle unit
31, 131: main spindle
32, 132: rod chamber
37, 137: motor rotor
39, 139: motor stator
35, 135: collet chuck (holder)
41, 141: front bearing
43, 143: rear bearing
45: first fixing bolt
145: fixing bolt
46: second fixing bolt
146: bolt screw
50, 150: case
51, 151: motor case 52, 152: inner peripheral surface
53, 153: cooling fin
55, 155: lid
56, 156: inner surface
57, 157: outer surface
58, 158: through-hole
61, 161: front case
62, 162: front body portion
64, 164: front flange portion
65, 165: front mounted surface
66, 166: inner surface
67, 167: contact surface (outer peripheral surface)
68, 168: bolt threaded hole
71, 171: rear case
72, 172: rear body portion
73, 173: contact surface
74, 174: rear flange portion
75, 175: rear mounted surface
76, 176: lid mounting surface
77, 177: outer peripheral surface
78, 178: bolt insertion hole
81, 181: cylinder
81r, 181r: cylinder chamber
82, 182: piston
83, 183: clamp rod
84, 184: coil spring
90, 190: movement restriction portion
91, 191: stopper ring
92: receiving portion
94, 194: first facing ring
95: first shaft contact portion
96: first facing portion
97, 197: second facing ring
98: second shaft contact portion
99: second facing portion
M: main spindle unit body
Sa: accommodation space
Sm: refrigerant space
Th: hob cutter (tool)
T: tool
W: workpiece
Ah: head axis
Ash: support head axis
Am: main axis
At: table axis
At1: first table axis
At2: second table axis
Dm: main axis direction
Dmf: front side
Dmb: rear side

The invention claimed is:

1. A main spindle unit which is attached to a unit support table which supports a first end of a tool such that the tool is able to rotate about an axis and holds a second end of the tool to rotate the tool about the axis, the unit comprising:
a main spindle which extends in an axial direction, in which the axis extends, about the axis;
a motor rotor which is fixed to an outer periphery of the main spindle;
a motor stator which is disposed on an outer periphery of the motor rotor;
a holder which is provided on a front side which is one end side of the main spindle in the axial direction and holds the tool;
a front bearing which is disposed on the front side of the motor rotor and on a rear side of the holder, the rear side being a side opposite to the front side, and rotatably supports the main spindle;
a rear bearing which is disposed on the rear side of the motor rotor and rotatably supports the main spindle;
a motor case which has a tubular shape about the axis and in which the motor stator is fixed to an inner peripheral surface thereof;
a front case which covers an outer periphery of the front bearing; and
a rear case which covers an outer periphery of the rear bearing,
wherein the front case has a front body portion which covers the outer periphery of the front bearing to hold the front bearing and a front flange portion which extends radially outward with respect to the axis from an outer periphery of the front body portion,
wherein the rear case has a rear body portion which covers an outer periphery of the rear bearing to hold the rear bearing and a rear flange portion which extends radially outward from an outer periphery of the rear body portion,
wherein an outer diameter of the front body portion is smaller than an inner diameter of the motor case,
wherein in the front flange portion, a front mounted surface which is able to come into contact with a first mounting surface of the unit support table facing the rear side and a contact surface which is in contact with the motor case are formed so as to face the front side,
wherein an outer diameter of the rear flange portion is larger than an outer diameter of the motor case, and
wherein in the rear flange portion, a rear mounted surface which is in contact with a second mounting surface of the unit support table facing the rear side is formed so as to face the front side.

2. The main spindle unit according to claim 1, wherein a bolt threaded hole is formed in the front flange portion.

3. The main spindle unit according to claim 1, wherein a bolt insertion hole which penetrates the rear flange portion from the rear mounted surface toward the rear side is formed in the rear flange portion.

4. The main spindle unit according to claim 1, wherein the front flange portion extends radially outward from a portion including a rear side end of the front body portion.

5. The main spindle unit according to claim 1, wherein the contact surface of the front flange portion is a surface which extends in the axial direction such that the front case is movable relative to the motor case in the axial direction.

6. The main spindle unit according to claim 5, further comprising:
a movement restriction portion which restricts a movement amount of a relative movement of the rear case with respect to the main spindle in the axial direction in the main spindle unit in which the front case is movable relative to the motor case in the axial direction.

7. The main spindle unit according to claim 6, wherein the front bearing is a bearing which receives a radial load and a thrust load with respect to the main spindle.

8. A machine tool comprising:
the main spindle unit according to claim 1;
a unit support table;

a workpiece holder which holds a workpiece which is a processing target; and a movement mechanism which moves the main spindle unit and the workpiece holder relative to each other.

* * * * *